(12) United States Patent
Kim et al.

(10) Patent No.: US 12,198,678 B2
(45) Date of Patent: Jan. 14, 2025

(54) ELECTRONIC DEVICE AND CONTROL METHOD THEREOF

(71) Applicant: SAMSUNG ELECTRONICS CO., LTD., Suwon-si (KR)

(72) Inventors: Changhan Kim, Suwon-si (KR); Bowon Kim, Suwon-si (KR); Jinsuk Lee, Suwon-si (KR); Hyeontaek Lim, Suwon-si (KR); Jungkwan Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 350 days.

(21) Appl. No.: 17/269,947

(22) PCT Filed: Jul. 26, 2019

(86) PCT No.: PCT/KR2019/009324
§ 371 (c)(1),
(2) Date: Feb. 19, 2021

(87) PCT Pub. No.: WO2020/045835
PCT Pub. Date: Mar. 5, 2020

(65) Prior Publication Data
US 2021/0256965 A1 Aug. 19, 2021

(30) Foreign Application Priority Data
Aug. 29, 2018 (KR) .................. 10-2018-0102253

(51) Int. Cl.
*G10L 15/08* (2006.01)
*G10L 15/02* (2006.01)
*G10L 25/78* (2013.01)

(52) U.S. Cl.
CPC .............. *G10L 15/08* (2013.01); *G10L 15/02* (2013.01); *G10L 25/78* (2013.01); *G10L 2015/025* (2013.01); *G10L 2015/088* (2013.01)

(58) Field of Classification Search
IPC ...................................................... G10L 704/20
See application file for complete search history.

(56) References Cited

U.S. PATENT DOCUMENTS

| 8,903,716 B2 | 12/2014 | Chen et al. |
| 8,930,196 B2 | 1/2015 | Jung et al. |

(Continued)

FOREIGN PATENT DOCUMENTS

| CN | 108235745 A | 6/2018 |
| KR | 10-0819928 | 4/2008 |

(Continued)

OTHER PUBLICATIONS

Office Action dated Feb. 2, 2023 in Korean Patent Application No. 10-2018-0102253 and English-language translation.

(Continued)

*Primary Examiner* — Pierre Louis Desir
*Assistant Examiner* — Fouzia Hye Solaiman
(74) *Attorney, Agent, or Firm* — Nixon & Vanderhye, P.C.

(57) ABSTRACT

An electronic device of the present disclosure comprises: a communication unit; a memory; and a processor for: detecting a voice section in an audio signal acquired by the electronic device; identifying whether a wake-up word stored in the memory exists in a user voice included in the detected voice section; when it is identified that the wake-up word exists in the user voice, transmitting, via the communication unit, the user voice to a server for providing a voice recognition service; and when response information for the user voice is received from the server, providing a response (Continued)

to the user voice on the basis of the received response information, wherein the processor identifies that the wake-up word exists in the user voice, when a part of the user voice matches the wake-up word. In particular, a method for acquiring a natural language for providing a response may use an artificial intelligence model learned according to at least one of machine learning, a neural network, and a deep learning algorithm.

9 Claims, 10 Drawing Sheets

(56) References Cited

U.S. PATENT DOCUMENTS

| | | | |
|---|---|---|---|
| 9,240,187 B2* | 1/2016 | Torok | G10L 15/222 |
| 9,390,726 B1 | 7/2016 | Smus et al. | |
| 9,619,200 B2 | 4/2017 | Chakladar et al. | |
| 9,779,732 B2 | 10/2017 | Lee et al. | |
| 11,276,402 B2 | 3/2022 | Luo | |
| 2013/0325484 A1* | 12/2013 | Chakladar | G10L 15/26 |
| | | | 704/275 |
| 2014/0163978 A1* | 6/2014 | Basye | G10L 15/28 |
| | | | 704/233 |
| 2014/0222436 A1* | 8/2014 | Binder | G10L 21/16 |
| | | | 704/275 |
| 2016/0125883 A1* | 5/2016 | Koya | G10L 15/22 |
| | | | 704/232 |
| 2017/0206895 A1 | 7/2017 | Tang | |
| 2017/0213569 A1* | 7/2017 | Jang | G10L 25/87 |
| 2018/0040324 A1* | 2/2018 | Wilberding | G10L 17/22 |
| 2018/0102127 A1 | 4/2018 | Izawa et al. | |
| 2020/0090653 A1 | 3/2020 | Luo | |

FOREIGN PATENT DOCUMENTS

| | | |
|---|---|---|
| KR | 10-2013-0133629 | 12/2013 |
| KR | 10-2016-0034855 | 3/2016 |
| KR | 10-2016-0064258 | 6/2016 |
| KR | 10-2018-0046780 | 5/2018 |
| WO | 2016/033269 | 3/2016 |

OTHER PUBLICATIONS

Office Action dated Mar. 14, 2023 in European Patent Application No. 19856010.4.
Extended European Search Report/Search Opinion dated Jun. 29, 2021 in counterpart European Patent Application No. 19856010.4.
International Search Report for PCT/KR2019/009324 dated Nov. 19, 2019, 5 pages with English Translation.
Written Opinion of the ISA for PCT/KR2019/009324 dated Nov. 19, 2019, 11 pages with English Translation.
Office Action dated Jul. 20, 2023 in Korean Patent Application No. 10-2018-0102253 and English-language translation.
Office Action dated Dec. 28, 2023 in Chinese Patent Application No. 201980052036.5 and English-language translation.
Office Action dated May 6, 2024 in Chinese Patent Application No. 201980052036.5 and English-language translation.
Office Action dated Jul. 12, 2024 in Chinese Patent Application No. 201980052036.5 and English-language translation.
Office Action dated Sep. 12, 2024 in Chinese Patent Application No. 201980052036.5 and English-language translation.

* cited by examiner

ELECTRONIC DEVICE AND CONTROL METHOD THEREOF

This application is the U.S. national phase of International Application No. PCT/KR2019/009324 filed Jul. 26, 2019 which designated the U.S. and claims priority to KR Patent Application No. 10-2018-0102253 filed Aug. 29, 2018, the entire contents of each of which are hereby incorporated by reference.

BACKGROUND

Field

The disclosure relates to an electronic device and a control method thereof, and more particularly, an electronic device for detecting a voice section and recognizing a voice and a control method thereof.

Description of Related Art

In recent years, various electronic devices have been developed along with development of electronic technologies. In particular, recently electronic devices capable of providing a speech recognition service for providing a response to a user's voice by using an artificial intelligence (AI) model which implements human-level intelligence have been developed.

Meanwhile, a method for a user to call a speech recognition service may include a method for pressing a button of an electronic device or uttering a call command. In particular, the method for uttering a call command is advantageous that a user is able to call the speech recognition service while the user is far away from the electronic device, it is easier than pressing a button, and a smooth user interface (UI) may be provided to a user.

However, when the user utters the call command, the call command may be recognized only when the call command is between silences, and accordingly, there is a problem that the speech recognition service is called by recognizing the call command only when the call command is uttered after silence and followed by a silence section.

Meanwhile, when consecutively calling the speech recognition service, a user has to utter the call command for each call. In addition, in a dialogue, it is general to call a person with a pronoun rather than calling a person with his/her name every time. However, the user has to utter the call command rather than the pronoun each time when calling the speech recognition service, thereby causing sense of difference to the user.

SUMMARY

The disclosure is made in view of the above needs and an object of the disclosure is to provide an electronic device for detecting a call command to call a speech recognition service, although a user consecutively utters a user's voice containing a call command, and a control method thereof.

In accordance with an aspect of the disclosure, there is provided an electronic device including a communicator, and a processor configured to, detect a voice section from an audio signal obtained by the electronic device, identify whether a wake-up word exists in a user's voice included in the detected voice section, based on the wake-up word being identified to exist in the user's voice, transmit the user's voice to a server for providing a speech recognition service via the communicator, and based on response information regarding the user's voice being received from the server, provide a response to the user's voice based on the received response information, in which the processor is configured to, based on a part of the user's voice matching with the wake-up word, identify that the wake-up word exists in the user's voice.

The processor may be configured to detect the voice section and a silence section from the audio signal based on a level of the audio signal, and based on a part of a user's voice included in the detected voice section matching with the wake-up word, identify that the wake-up word exists in the user's voice.

The processor may be configured to detect a section having a magnitude equal to or more than a predetermined level from the audio signal as the voice section, and detect a section having a magnitude less than the predetermined level from the audio signal as the silence section.

The processor may be configured to obtain a plurality of phonemes from the user's voice by dividing the user's voice in a phonemic unit, and based on a word configured with the obtained plurality of phonemes matching with the wake-up word, identify that the wake-up word exists in the user's voice.

The processor may be configured to, based on the wake-up word being identified to exist in the user's voice, transmit a remaining user's voice excluding the wake-up word from among the user's voice to the server.

The processor may be configured to detect a plurality of voice sections from the audio signal, and based on a part of a user's voice included in any one voice section among the plurality of voice sections matching with the wake-up word, transmit a remaining user's voice excluding the wake-up word from among the user's voice included in the any one voice section and user's voices include in the remaining voice sections to the server.

The processor may be configured to, based on an audio signal being obtained within a predetermined period of time after identifying that the wake-up word exists in the user's voice, identify whether a predetermined word exists in a user's voice included in a voice section of the audio signal, and, based on the predetermined word being identified to exist, transmit the user's voice included in the voice section to the server via the communicator.

The predetermined word may include a pronoun.

In accordance with another aspect of the disclosure, there is provided a method for controlling an electronic device, the method including, detecting a voice section from an audio signal obtained by the electronic device, identifying whether a wake-up word exists in a user's voice included in the detected voice section, based on the wake-up word being identified to exist in the user's voice, transmitting the user's voice to a server for providing a speech recognition service, and based on response information regarding the user's voice being received from the server, providing a response to the user's voice based on the received response information, in which the identifying includes, based on a part of the user's voice matching with the wake-up word, identifying that the wake-up word exists in the user's voice.

The detecting may include detecting the voice section and a silence section from the audio signal based on a level of the audio signal, and based on a part of a user's voice included in the detected voice section matching with the wake-up word, identifying that the wake-up word exists in the user's voice.

The detecting may include detecting a section having a magnitude equal to or more than a predetermined level from the audio signal as the voice section, and detecting a section having a magnitude less than the predetermined level from the audio signal as the silence section.

The identifying may include obtaining a plurality of phonemes from the user's voice by dividing the user's voice in a phonemic unit, and based on a word configured with the obtained plurality of phonemes matching with the wake-up word, identifying that the wake-up word exists in the user's voice.

The transmitting may include, based on the wake-up word being identified to exist in the user's voice, transmitting a remaining user's voice excluding the wake-up word from among the user's voice to the server.

The detecting may include detecting a plurality of voice sections from the audio signal, and the transmitting may include, based on a part of a user's voice included in any one voice section among the plurality of voice sections matching with the wake-up word, transmitting a remaining user's voice excluding the wake-up word from among the user's voice included in the any one voice section and user's voices include in the remaining voice sections to the server.

The method may further include, based on an audio signal being obtained within a predetermined period of time after identifying that the wake-up word exists in the user's voice, identifying whether a predetermined word exists in a user's voice included in a voice section of the audio signal, and, based on the predetermined word being identified to exist, transmitting the user's voice included in the voice section to the server via the communicator.

The predetermined word may include a pronoun.

According to the various embodiments of the disclosure, it is possible to provide an electronic device for detecting a call command included in a user's voice to call a speech recognition service, even if the user consecutively utters a user's voice including a call command with natural utterance, and a control method thereof.

In addition, when calling the speech recognition service consecutively, even if a user utters a predetermined word including a pronoun, the speech recognition service may be called in the same manner as with the utterance of the call command, thereby providing natural user interface to the user.

DETAILED DESCRIPTION

Figure 1:
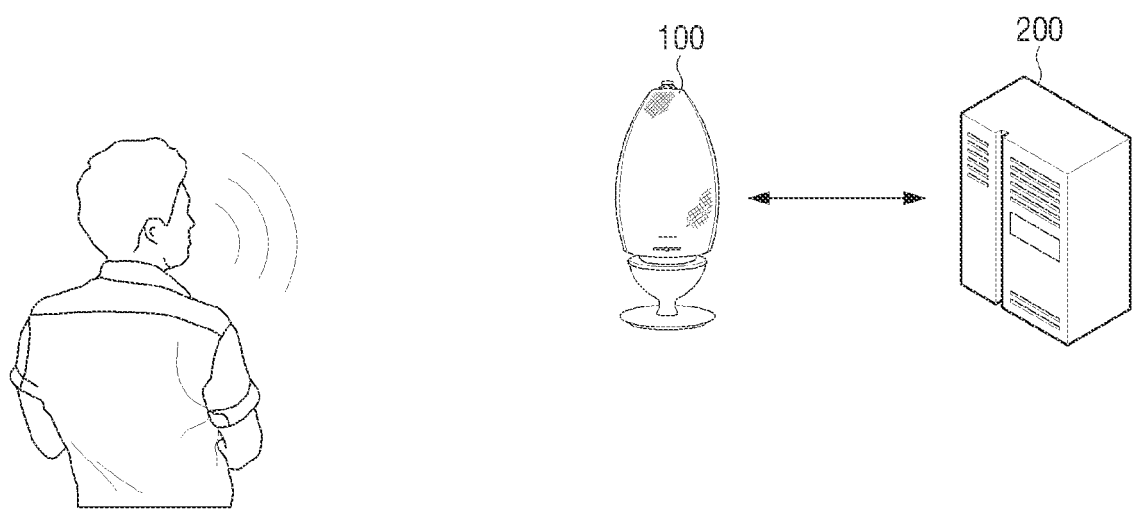
FIG. 1 is a diagram illustrating a system for providing a speech recognition service according to an embodiment.

In describing the disclosure, a detailed description of the related art or configuration may be omitted when it is determined that the detailed description may unnecessarily obscure a gist of the disclosure. In addition, the embodiments below may be changed in various forms and the scope of the technical idea of the disclosure is not limited to the embodiments below. The embodiments are provided to complete the disclosure and completely transfer the technical idea of the disclosure to those skilled in the art.

It should be noted that the technologies disclosed in this disclosure are not for limiting the scope of the disclosure to a specific embodiment, but they should be interpreted to include all modifications, equivalents and/or alternatives of the embodiments of the disclosure. In relation to explanation of the drawings, similar reference numerals may be used for similar elements.

The expressions "first," "second" and the like used in the disclosure may denote various elements, regardless of order and/or importance, and may be used to distinguish one element from another, and does not limit the elements.

In this disclosure, expressions such as "A or B", "at least one of A [and/or] B,", or "one or more of A [and/or] B," include all possible combinations of the listed items. For example, "A or B", "at least one of A and B,", or "at least one of A or B" includes any of (1) at least one A, (2) at least one B, or (3) at least one A and at least one B.

In the disclosure, unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. The expression "configured to (or set to)" does not necessarily refer to a device being "specifically designed to" in terms of hardware. Instead, under some circumstances, the expression "a device configured to" may refer to the device being "capable of" performing an operation together with another device or component. For example, the phrase "a processor configured (or set) to perform A, B, and C" may refer, for example, and without limitation, to a dedicated processor (e.g., an embedded processor) for performing the corresponding operations, a generic-purpose processor (e.g., a CPU or an application processor), or the like, that can perform the operations by executing one or more software programs stored in a memory device.

An electronic device in the disclosure may be implemented as a device such as a smartphone, a tablet PC, a speaker, a mobile phone, a telephone, an electronic book reader, a desktop PC, a laptop PC, a work station, a server, a PDA, a portable multimedia player (PMP), an MP3 player, a medical device, a camera, a television, a digital video disk (DVD) player, a refrigerator, an air conditioner, a cleaner, an oven, a microwave, a washing machine, an air purifier, a set-top box, a home automation control panel, a security control panel, a media box (e.g., SAMSUNG HOME-SYNC™, APPLE TV™, or GOOGLE TV™), a game console (e.g., XBOX™, PLAYSTATION™), an electronic dictionary, an electronic key, a camcorder, an electronic frame, or a wearable device. The wearable device herein may include at least one of an accessory type (e.g., a watch, a ring, a bracelet, an ankle bracelet, a necklace, a pair of glasses, a contact lens or a head-mounted-device (HMD)); a fabric or a garment-embedded type (e.g.: electronic cloth); skin-attached type (e.g., a skin pad or a tattoo); or a bio-implant type (implantable circuit).

Hereinafter, various embodiments of the disclosure will be described in detail with reference to the accompanying drawings.

FIG. 1 is a diagram illustrating a system for providing a speech recognition service according to an embodiment.

Referring to FIG. 1, a system for providing a speech recognition service may include an electronic device 100 and a server 200.

Referring to FIG. 1, the electronic device 100 may be implemented as a speaker that is a device communicable with the server 200. However, this is merely an example and the electronic device 100 may be implemented as various types of devices as described above.

The electronic device 100 may provide a service for performing speech recognition of a user's voice to provide information or perform an operation (hereinafter, may be referred to as a speech recognition service or an assistant service).

For this, the electronic device 100 may obtain a user's voice and transmit the obtained user's voice to the server 200 which provides the speech recognition service. In this case, the electronic device 100 may be connected to the server 200 via a wired or wireless network to transmit and receive various information.

Specifically, the electronic device 100 may detect a wake-up word (or call command) from the user's voice, wake the electronic device 100 up, when the wake-up word is detected from the user's voice, and transmit the user's voice to the server 200. Herein, the waking up may refer to that the electronic device 100 activates (or calls) the speech recognition service.

Meanwhile, when a user's voice is received from the electronic device 100, the server 200 may perform speech recognition regarding the received user's voice. Herein, the server 200 may be a server for providing a speech recognition service using an artificial intelligence (AI) agent.

For this, the server 200 may include a dialogue system for providing a response to a user's voice by using an artificial intelligence model.

Specifically, the server 200 may perform speech recognition regarding a user's voice to convert the user's voice into a text, and grasp intent and entity of the user's voice based on a speech recognition result. The server 200 may obtain information regarding the response to the user's voice based on a natural language understanding result and obtain a natural language as response information of the user's voice based on the obtained information. The server 200 may transmit the response information to the electronic device 100.

For this, the server 200 may include an automatic speech recognition (ASR) module, a natural language understanding (NLU) module, a dialogue management (DM) module, a natural language generation (NLG) module, and the like.

Meanwhile, the electronic device 100 may provide a response to the user's voice based on the received response information.

For example, the electronic device 100 may convert a text included in the received response information into a voice through a text-to-speech (TTs) to output the voice, or display a user interface including the corresponding text via a display (not illustrated) of the electronic device 100.

The above dialogue system may provide the response to the user's voice, and accordingly, the user may have a dialogue with the electronic device 100.

Meanwhile, although it is the same word, users may utter the word with different utterance speeds, silences (pause between syllables or words), accents, and the like depending on linguistic habits or current situations (stammer, articulation disorder, and the like) of the users. For example, the user may consecutively utter a user's voice containing a wake-up word and a specific word (or phrase, clause, or sentence) without any silences or may utter other words first and then utter the wake-up word, rather than uttering the wake-up word first.

In this case, when detecting the wake-up word, the electronic device 100 according to an embodiment of the disclosure may divide the user's voice into a voice section and a silence section, and analyze the user's voice included in the voice section in a phonemic unit to detect the wake-up word.

Accordingly, the electronic device 100 may detect the wake-up word from the user's voice, not only when the user consecutively utters the user's voice including the wake-up word and the specific word without any silence, but also when the user utters the wake-up word after uttering other words first.

Accordingly, a range for detecting the wake-up word for calling the speech recognition service and an accuracy thereof may be improved, and the user is able to call the speech recognition service with natural utterance. Therefore, a level of satisfaction and convenience of the user may be improved.

Hereinafter, the disclosure will be described in detail with reference to the accompanying drawings.

Figure 2:
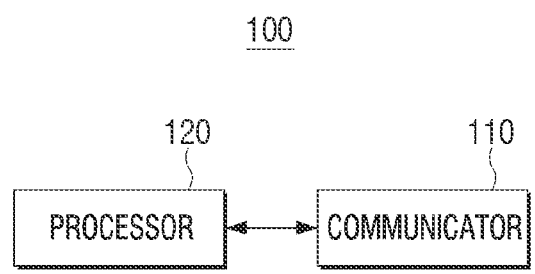
FIG. 2 is a block diagram of an electronic device according to an embodiment.

FIG. 2 is a block diagram of an electronic device according to an embodiment.

Referring to FIG. 2, the electronic device 100 may include a communicator 110 and a processor 120.

The communicator 110 may communicate with an external device according to various types of communication methods. For example, the communicator 110 may be connected to the server 200 or an external electronic device via a wired or wireless network to perform the communication. Herein, the server 200 may include a server for providing a speech recognition service by using a trained artificial intelligence model.

In this case, the communicator 110 may transmit the user's voice obtained by the electronic device 100 to the server 200 and receive response information corresponding to the user's voice obtained via the artificial intelligence model from the server 200.

For this, the communicator 110 may include at least one of a Wi-Fi chip, an Ethernet chip, a Bluetooth chip, and a wireless communication chip.

The processor 120 may control general operations of the electronic device 100.

In particular, the processor 120 may detect a voice section from an audio signal obtained by the electronic device 100, identify whether a wake-up word exists in the user's voice included in the detected voice section, transmit the user's voice to the server 200 providing the speech recognition service via the communicator 110, when it is identified that the wake-up word exists in the user's voice, and provide a response to the user's voice based on the received response information, when response information regarding the user's voice is received from the server 200.

Specifically, the electronic device 100 may obtain an audio signal from a voice uttered by the user. For example, the electronic device 100 may obtain the audio signal from the voice uttered by the user input via an internal microphone or an external microphone. In another embodiment, the electronic device 100 may receive a voice uttered by the user input to an external electronic device (not illustrated) from the external electronic device (not illustrated) and obtain the audio signal from the received voice.

In this case, the processor 120 may store the audio signal obtained by the electronic device 100 in a memory (not illustrated).

Meanwhile, the processor 120 may detect a voice section from the audio signal obtained by the electronic device 100. Specifically, the processor 120 may detect the voice section by a method for firstly removing a surrounding noise or radio noise from the audio signal and then removing a silence section (or non-voice section).

In this case, the processor 120 may detect the voice section and the silence section from the audio signal based on a level of the audio signal. Herein, the level of the audio signal may be a voltage (or power) value of the audio signal or an average voltage (or power) value. Specifically, the processor 120 may detect a section having a magnitude equal to or more than a predetermined level from the audio signal as the voice section and detect a section having a magnitude less than the predetermined level from the audio signal as the silence section. For example, in general, if 15 decibels (dB) that is a level when a person is whispering is set as a reference level, the processor 120 may detect a section having a magnitude equal to or more than 15 decibels from the audio signal as the voice section and detect a section having a magnitude less than 15 decibels as the silence section.

The processor 120 may identify (or detect) whether a wake-up word exists in the user's voice included in the detected voice section.

At this time, the wake-up word may refer to a trigger word (or call command) for executing the speech recognition service or requesting a response of the speech recognition service, and the user may utter the wake-up word in order to call the speech recognition service by a voice. Such a wake-up word may be a name or the like of an artificial intelligence for providing speech recognition service.

For this, the processor 120 may divide the user's voice in the phonemic unit to obtain a plurality of phonemes from the user's voice, and obtain a word configured with the obtained plurality of phonemes.

Specifically, the processor 120 may divide the user's voice included in the detected voice section into texts in the phonemic unit through a speech-to-text (STT) process. Herein, the phoneme may refer to a minimum unit of a sound. The processor 120 may search for a word with a pronunciation same as a pronunciation of a set of phonemes from a pronunciation dictionary, and obtain a word with a meaning from the obtained plurality of phonemes. Alternatively, the processor 120 may input the obtained plurality of phonemes to a trained artificial intelligence model to obtain a word with a meaning from the obtained plurality of phonemes. In this case, the artificial intelligence model may be a model trained to obtain a word with a meaning from the obtained plurality of phonemes by considering utterance intent of the user, a relationship between a syllable and other syllables before and after the syllable, and the like.

Hereinafter, the processor 120 may identify whether the wake-up word exists in the user's voice included in the voice section.

Specifically, when a word obtained as a result of analysis of the user's voice included in the voice section in a phonemic unit matches with the wake-up word or at least one of a plurality of words obtained as a result of analysis matches with the wake-up word, the processor 120 may determine that the wake-up word exists in the user's voice. At this time, the processor 120 may determine that the words match with each other, not only when the obtained word matches with the wake-up word, but also when the both words have a similarity equal to or more than a predetermined value.

For example, it is assumed that "Bixby" is the wake-up word and the user utters "Bixby, how's the weather?"

In this case, the processor 120 may detect a user's voice such as "Bixby, how's the weather?" from a voice section, and analyze the user's voice in a phonemic unit to obtain words such as "Bixby", "how's", and "weather" from the user's voice such as "Bixby, how's the weather?" At this time, the processor 120 may determine that the wake-up word exists in the user's voice such as "Bixby, how's the weather?", since "Bixby" among the obtained words matches with the wake-up word.

In another example, it is assumed that "Bixby" is the wake-up word and the user utters "Hey, Bixby, how's the weather?"

In this case, the processor 120 may remove a silence section, detect a user's voice such as "Hey, Bixby, how's the weather?" from each voice section, and analyze the user's voice in a phonemic unit to obtain words such as "Hey", "Bixby", "how's", and "the weather" from the user's voice such as "Hey, Bixby, how's the weather?" At this time, since the "Bixby" among the obtained words matches with the wake-up word, the processor 120 may determine that the wake-up word exists in the user's voice such as "Hey, Bixby, how's the weather?"

Accordingly, when some words among the user's voice match with the wake-up word, the processor 120 may identify that the wake-up word exists in the user's voice.

Meanwhile, the processor 120 may divide the user's voice in the phonemic unit to obtain a plurality of phonemes from the user's voice, and determine whether the phoneme corresponding to the wake-up word exists in the obtained plurality of phonemes. Herein, the phoneme corresponding to the wake-up word may be a first phoneme among the phonemes divided from the wake-up word in the phonemic unit.

When it is determined that the phoneme corresponding to the wake-up word exists in the obtained plurality of phonemes, the processor 120 may preferentially combine the plurality of phonemes obtained in sequence from the phoneme corresponding to the wake-up word to obtain a word configured with the obtained plurality of phonemes.

For example, it is assumed that "빅스비 (corresponding to Korean alphabets of Bixby)" is the wake-up word and the user utters "저기 빅스비 (Hey, Bixby)". Herein, the phoneme corresponding to the wake-up word may be "ㅂ" that is a first phoneme among the phonemes "ㅂ, ㅣ, ㄱ, ㅅ, ㅡ, ㅂ, and ㅣ" divided from the predetermined wake-up word in the phonemic unit.

For reference, pronunciations corresponding to Korean consonants are same as in Table 1 below and pronunciations corresponding to Korean vowels are same as in Table 2 below.

TABLE 1

| ㄱ | ㄴ | ㄷ | ㄹ | ㅁ | ㅂ | ㅅ | ㅇ | ㅈ | ㅊ |
|---|---|---|---|---|---|---|---|---|---|
| g, k | n | d, t | r, l | m | b, p | s | ng | j | ch |
| ㅋ | ㅌ | ㅍ | ㅎ | ㄲ | ㄸ | ㅃ | ㅆ | ㅉ | |
| k | t | p | h | kk | tt | pp | ss | jj | |

TABLE 2

| ㅏ | ㅑ | ㅓ | ㅕ | ㅗ | ㅛ | ㅜ |
|---|---|---|---|---|---|---|
| a | ya | eo | yeo | o | yo | u |
| ㅠ | ㅡ | ㅣ | ㅐ | ㅒ | ㅔ | ㅖ |
| yu | eu | 1 | ae | yae | e | ye |
| ㅚ | ㅘ | ㅙ | ㅟ | ㅝ | ㅞ | ㅢ |
| oe | wa | wae | wi | wo | we | ui |

In this case, the processor 120 may detect a user's voices such as "저기 (Hey)" and "빅스비 (Bixby)" from the voice section and analyze the user's voices in the phonemic unit to obtain phonemes such as "ㅈ, ㅓ, ㄱ, and ㅣ" and "ㅂ, ㅣ, ㄱ, ㅅ, ㅡ, ㅂ, and ㅣ" from the user's voices. Herein, when obtaining a word using the phonemes obtained from the user's voice, the processor 120 may preferentially obtain the word "빅스비 (Bixby)" configured with "ㅂ, ㅣ, ㄱ, ㅅ, ㅡ, ㅂ, and ㅣ" which are phonemes obtained in sequence from "ㅂ" which is a phoneme corresponding to the wake-up word. The processor 120 may identify that the wake-up word exists in the user's voice, since the obtained word "Bixby" matches with the wake-up word.

Accordingly, the wake-up word is preferentially obtained from the user's voice to improve a speed for identifying whether the wake-up word exists in the user's voice.

Meanwhile, when it is identified that the wake-up word exists in the user's voice, the processor 120 may wake the electronic device 100 up to provide a speech recognition service.

Specifically, when it is identified that the wake-up word exists in the user's voice, the processor 120 may transmit the user's voice to the server 200 for providing the speech recognition service via the communicator 110. At this time, the processor 120 may transmit the user's voice containing audio information or text information to the server 200.

Herein, when it is identified that the wake-up word exists in the user's voice, the processor 120 may transmit the remaining user's voice excluding the wake-up word from the user's voice to the server 200.

For example, it is assumed that the "Bixby" is the wake-up word and the user utters "Bixby, how's the weather?" In this case, the processor 120 may obtain words such as "Bixby", "how's", and "weather" from the user's voice. Herein, the processor 120 may determine that the wake-up word exists in the user's voice, since the "Bixby" matches with the wake-up word among the obtained words. At this time, the processor 120 may transmit "how's the weather" that is the remaining user's voice excluding the wake-up word "Bixby" to the server 200.

Herein, the processor 120 may detect a plurality of voice sections from the audio signal, and, when a part of the user's voice included in any one voice section among a plurality of voice sections matches with the wake-up word, the processor 120 may transmit the remaining user's voice excluding the wake-up word from the user's voice included in any one voice section and the user's voice included in the remaining voice sections to the server 200. Herein, the plurality of voice sections may be divided by a period of time for keeping a silence (or length of a silence section).

For example, it is assumed that "Bixby" is the wake-up word and the user utters "Hey, Bixby, how's the weather?" In this case, the processor 120 may detect a plurality of voice sections of "Hey, Bixby (first voice section)", (silence section), and "how's the weather (second voice section)" in sequence from the audio signal obtained by the electronic device 100. At this time, since "Bixby" which is a part of the user's voice included in the "Hey, Bixby (first voice section)" among the detected plurality of voice sections matches with the wake-up word, the processor 120 may transmit "Hey" which is the remaining part excluding the wake-up word included in the "Hey, Bixby (first voice section)" and "how's the weather" that is the user's voice included in the remaining second voice section to the server 200.

Meanwhile, the processor 120 may transmit a user's voice obtained for a predetermined period before or after a point when it is identified that the wake-up word exists in the user's voice to the server 200.

For example, it is assumed that the wake-up word is "Bixby" and the user utters "Hello? Hey, Bixby, how's the weather?" In this case, the processor 120 may remove the silence section, detecting user's voices such as "Hello", "Hey", "Bixby", and "how's the weather" from each voice section, and analyze the user's voices in the phonemic unit to obtain words such as "Hello", "Hey", "Bixby", "how's", and "weather" from the user's voices. Herein, the processor 120 may identify that the wake-up word exists in the user's voice, since "Bixby" matches with the wake-up word among the obtained words.

Assuming that the user's voice obtained for the predetermined period of time before the point when "Bixby" is identified is "Hey", and the user's voice obtained for the predetermined period of time after the point when "Bixby" is identified is "weather, the processor 120 may transmit the user's voice containing "Hey" obtained for the predetermined period of time before the point when "Bixy" is identified and the user's voice containing "weather" obtained for the predetermined period of time after the point when "Bixy" is identified, among the remaining user's voices excluding the wake-up word "Bixby", to the server 200.

Meanwhile, when response information regarding the user's voice is received form the server 200, the processor 120 may provide a response to the user's voice based on the received response information.

For this, the server 200 may receive a user's voice from the electronic device 100, perform speech recognition regarding the user's voice to obtain response information regarding the user's voice, and transmit the response information of the user's voice to the electronic device 100.

When the response information regarding the user's voice is received form the server 200, the processor 120 may provide the response to the user's voice in at least one form of a sound, a text, an image, and a video based on the received response information or perform a specific operation (e.g., operation of turning light off in living room) as the response to the user's voice based on the received response information. At this time, the processor 120 may convert a text included in the received response information into a sound through text-to-speech (TTS) technology to output a sound, or display the text included in the received response information on a display (not illustrated) of the electronic device 100 via user interface, based on the received response information.

Meanwhile, when an audio signal is obtained within a predetermined period of time after it is identified that the wake-up word exists in the user's voice, the processor 120 may identify whether a predetermined word exists in the user's voice included in the voice section of the audio signal, and transmit the user's voice included in the voice section to the server 200 via the communicator 110, when it is identified that the predetermined word exists.

Herein, the predetermined word may include a pronoun. For example, the predetermined word may include a pronoun such as you, sweetie, darling, or honey, and the user may add or change the predetermined word.

According to an embodiment described above, the user may utter the predetermined word including the pronoun to call the speech recognition service within the predetermined period of time after detecting the wake-up word, and the user may perform the speech recognition through smooth dialogue like as normal dialogue with a person. Accordingly, convenience and satisfaction of the user who consecutively calls the speech recognition service may be improved.

Figure 3A:
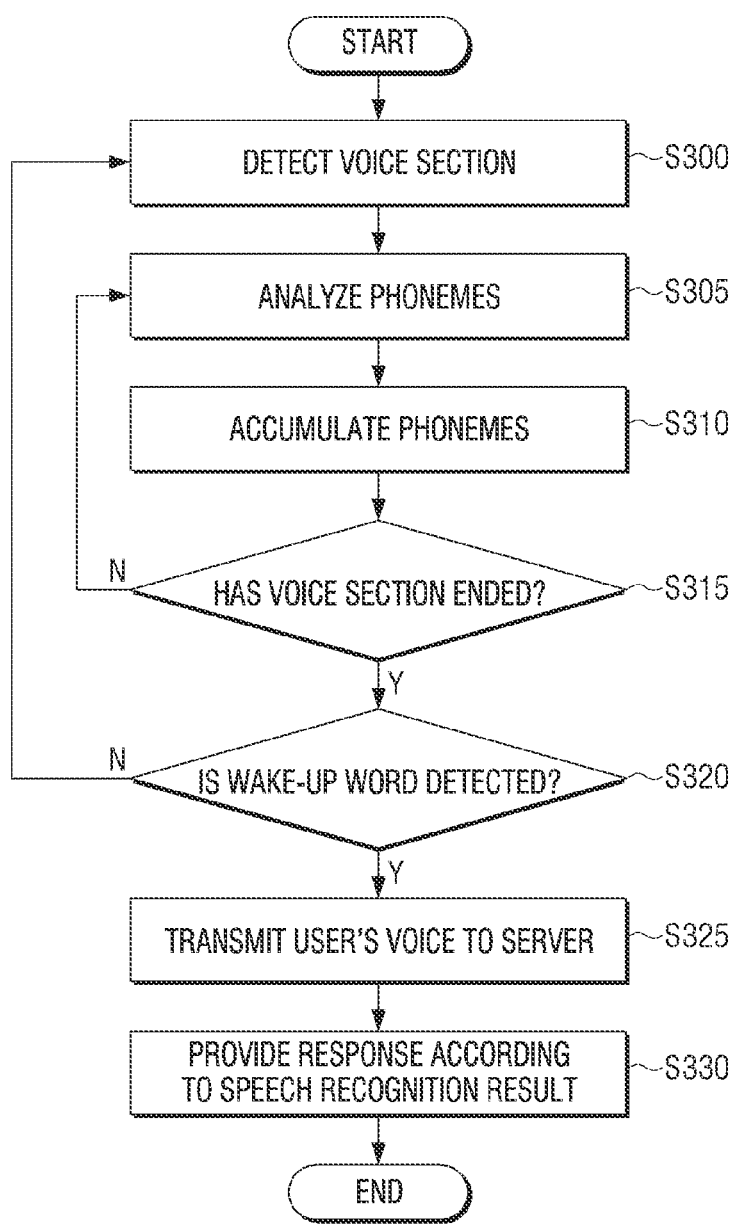
FIGS. 3A and 3B are diagrams illustrating a method for controlling the electronic device according to an embodiment.
Figure 3B:
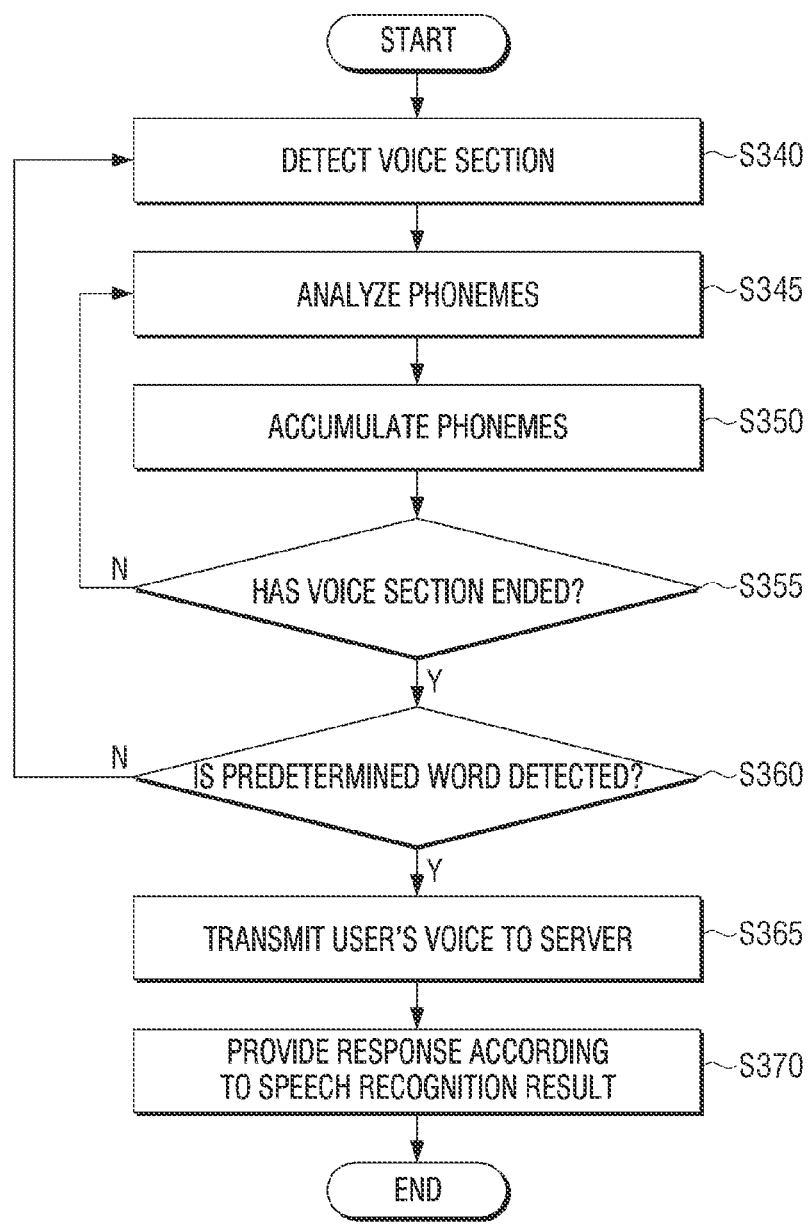

FIGS. 3A and 3B are diagrams illustrating a method for controlling the electronic device according to an embodiment.

Referring to FIG. 3A, the processor 120 may detect the voice section from the audio signal obtained by the electronic device 100 (S300).

Next, the processor may identify whether the wake-up word exists in the user's voice included in the detected voice section.

Specifically, the processor 120 may analyze the user's voice included in the detected voice section in the phonemic unit to obtain phonemes from the user's voice (S305).

The processor 120 may accumulate phonemes obtained until the end of the voice section to obtain a plurality of phonemes, and obtain a word configured with the obtained plurality of phonemes (S310).

The processor 120 may determine whether the voice section has ended (S315). At this time, a length of the silence section may be a reference for determining whether the voice section has ended. For example, when the time for keeping the silence satisfies a predetermined period of time, the processor 120 may determine that the voice section has ended.

As a result of the determination whether the voice section has ended, when the voice section has ended (S315, Yes), the processor 120 may determine whether the user's voice including the word configured with the obtained plurality of phonemes matches with the wake-up word (S320), and when the voice section has not ended (S315, NO), the processor 120 may obtain a plurality of phonemes from the detected voice section again (S310).

As a result of the determination whether the user's voice matches with the wake-up word, when a part of the user's voice matches with the wake-up word (S320, Yes), the processor 120 may identify that the wake-up word exists in the user's voice. Meanwhile, when the user's voice does not match with the wake-up word (S320, No), the processor 120 may perform an operation of detecting the voice section from the audio signal obtained by the electronic device 100 again (S300).

When it is identified that the wake-up word exists in the user's voice, the processor 120 may transmit the user's voice to the server 200 providing the speech recognition service via the communicator 110.

When response information regarding the user's voice is received from the server, the processor 120 may provide a response to the user's voice based on the received response information (S330).

As another embodiment, referring to FIG. 3B, a case where an audio signal is obtained within a predetermined period of time from the point when it is identified that the wake-up word exists will be described.

The processor 120 may detect a voice section from an audio signal obtained by the electronic device 100 within the predetermined period of time from the point when it is identified that the wake-up word exists (S340), analyze the user's voice included in the detected voice section in the phonemic unit to obtain phonemes from the user's voice (S345), accumulate phonemes obtained until the end of the voice section to obtain a plurality of phonemes, and obtain a word configured with the obtained plurality of phonemes (S350).

The processor 120 may determine whether the voice section has ended (S355), and, when the voice section has ended (S355, Yes), determine whether the user's voice including the word configured with the obtained plurality of phonemes matches with the predetermined word (S360).

Herein, the predetermined word may include a pronoun. For example, the predetermined word may include a pronoun such as "you, sweetie, darling, or honey".

When it is identified that the predetermined word exists in the user's voice (S360, Yes), the processor 120 may transmit the user's voice included in the voice section of the audio signal to the server 200 via the communicator 110 (S365).

When the response information regarding the user's voice is received form the sever 200, the processor 120 may provide the response to the user's voice based on the received response information (S370).

Figure 4A:
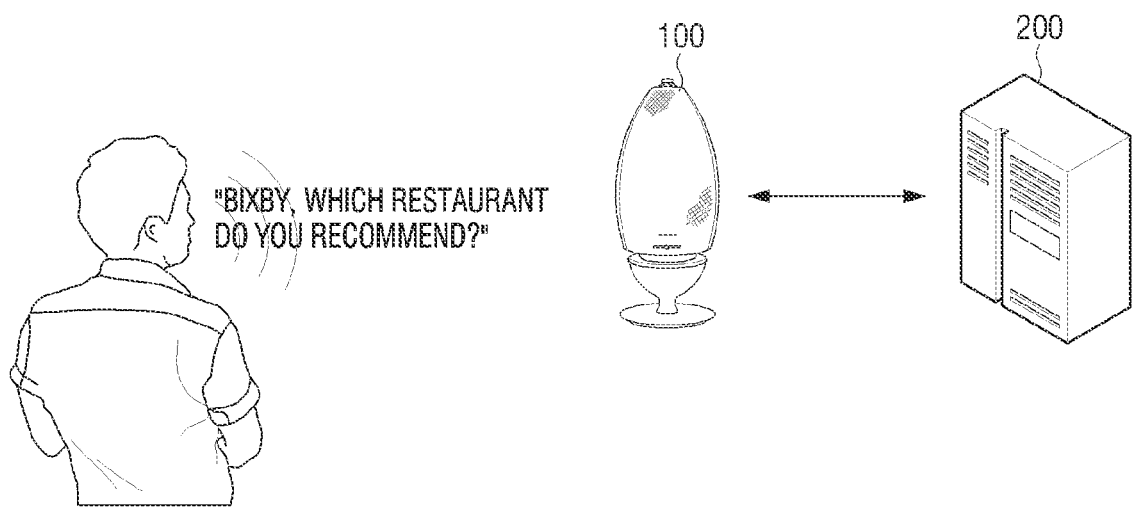
FIGS. 4A, 4B and 4C are diagrams illustrating specific examples of determining a wake-up word.
Figure 4B:
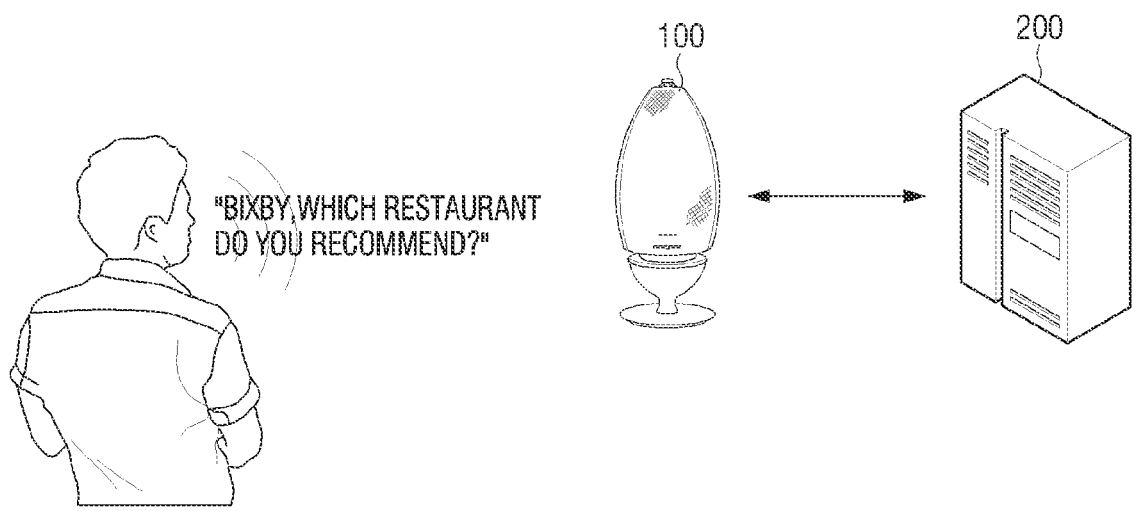
Figure 4C:
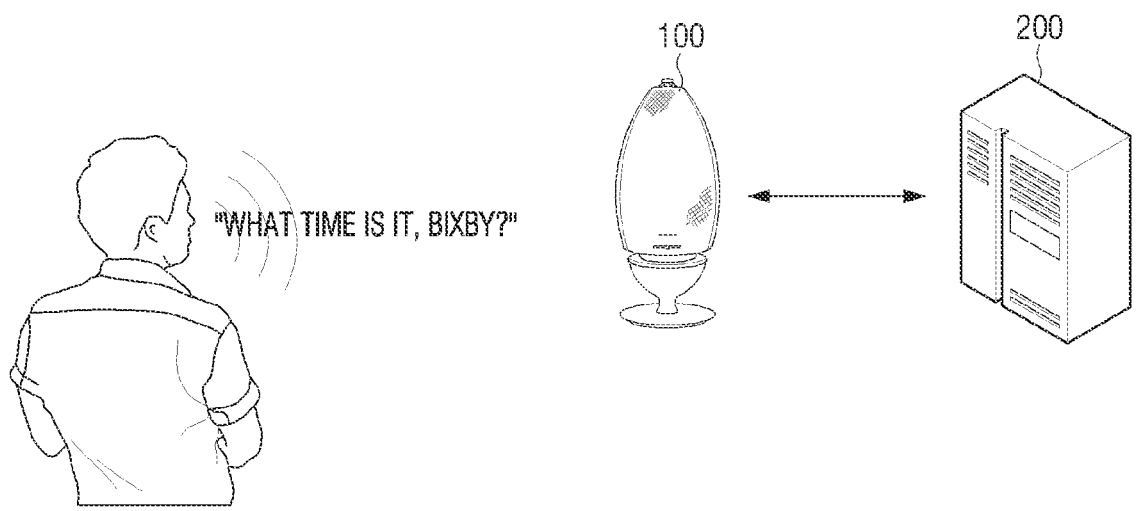

FIGS. 4A to 4C are diagrams illustrating specific examples of determining a wake-up word according to an embodiment. Herein, it is assumed that the wake-up word is set as "Bixby".

Referring to FIG. 4A, the user utters "빅스비, 추천식당은? (Bixby, which restaurant do you recommend?)"

In this case, the processor 120 may detect voice sections and a silence section such as "빅스비 (Bixby) (first voice section)", (silence section), and "추천식당은 (which restaurant do you recommend) (second voice section)" from the voice uttered by the user, and analyze the detected voice sections in the phonemic unit to obtain a plurality of phonemes such as "ㅂ, ㅣ, ㄱ, ㅅ, ㅡ, ㅂ, and ㅣ", and "ㅊ, ㅜ, ㅊ, ㅓ, ㄴ, ㅅ, ㅣ, ㄱ, ㄷ, ㅏ, ㅇ, (ㅇ), ㅡ, and ㄴ".

The processor 120 may input the obtained plurality of phonemes to a trained artificial intelligence model to obtain words such as "Bixby", "recommend", "restaurant", "do" from the obtained plurality of phonemes. Since "Bixby" among the obtained words matches with the wake-up word, the processor 120 may determine that the wake-up word exists in the user's voice.

The processor 120 may transmit "which restaurant do you recommend" among remaining user's voice excluding the wake-up word to the server 200. When response information is received as a result of recognition regarding "which restaurant do you recommend" from the server 200, the processor 120 may provide a response such as "How's restaurant YYY located in XXX?" based on the received response information.

Referring to FIG. 4B, the user utters " 빅스비추천식당은 (Bixby, which restaurant do you recommend?)"

In this case, the processor 120 may detect " 빅스비추천식당은 (Bixby, which restaurant do you recommend)" as a voice section from the voice uttered by the user, and analyze the detected voice section in the phonemic unit to obtain a plurality of phonemes such as "ㅂ, ㅣ, ㄱ, ㅅ, ㅡ, ㅂ, ㅣ, ㅊ, ㅜ, ㅊ, ㅓ, ㄴ, ㅅ, ㅣ, ㄱ, ㄷ, ㅏ, ㅇ, (ㅇ), ㅡ, and ㄴ".

The processor 120 may input the obtained plurality of phonemes to the trained artificial intelligence model to obtain words such as "Bixby", "recommend", "restaurant", and "do" from the obtained plurality of phonemes. Since "Bixby" among the obtained words matches with the wake-up word, the processor 120 may determine that the wake-up word exists in the user's voice.

The processor 120 may transmit "which restaurant do you recommend" among remaining user's voice excluding the wake-up word to the server 200. When response information is received as a result of recognition regarding "which restaurant do you recommend" from the server 200, the processor 120 may provide a response such as "How's restaurant YYY located in XXX?" based on the received response information.

Referring to FIG. 4C, the user utters " 몇시니,, 빅스비? (What time is it, Bixby?)"

In this case, the processor 120 may detect voice sections and a silence section such as " 몇시니 (What time is it) (first voice section)", (silence section), "빅스비 (Bixby) (second voice section)" from the voice uttered by the user, and analyze the detected voice sections in the phonemic unit to obtain a plurality of phonemes such as "ㅁ, ㅓ, ㅊ, ㅅ, ㅣ, ㄴ, and ㅣ", "ㅂ, ㅣ, ㄱ, ㅅ, ㅡ, ㅂ, and ㅣ".

The processor 120 may input the obtained plurality of phonemes to the trained artificial intelligence model to obtain words such as "what", "time", "is it", and "Bixby" from the obtained plurality of phonemes. Since "Bixby" among the obtained words matches with the wake-up word, the processor 120 may determine that the wake-up word exists in the user's voice.

At this time, the processor 120 may transmit "what time is it" among the remaining user's voices excluding the wake-up word to the server 200. When the response information is received from the server 200 as a result of the recognition regarding "what time is it", the processor 120 may provide a response such as "The current time is 3 P.M" based on the received response information.

Figure 5:
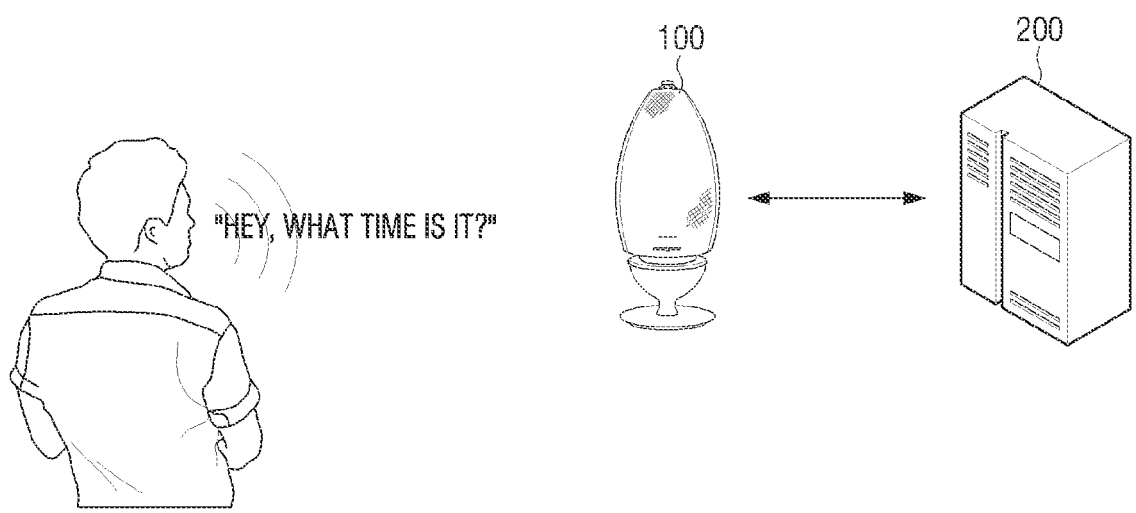
FIG. 5 is a diagram illustrating a specific example of determining a predetermined word.

FIG. 5 is a diagram illustrating a specific example of determining a predetermined word according to an embodiment. Herein, it is assumed that the audio signal is obtained within the predetermined period of time after the electronic device 100 is waken up and it is assumed that the predetermined word is set as "hey".

Referring to FIG. 5, the user utters "야, 몇시니? (Hey, what time is it?)" within the predetermined period of time after the electronic device 100 is waken up.

In this case, the processor 120 may detect voice sections and a silence section such as "야 (Hey) (first voice section)", (silence section), and "몇시니 (what time is it) (second voice section" from the voice uttered by the user, and analyze the detected voice sections in the phonemic unit to obtain a plurality of phonemes such as "(ㅇ), ㅑ", "ㅁ, ㅓ, ㅊ, ㅅ, ㅣ, ㄴ, and ㅣ".

The processor 120 may input the obtained plurality of phonemes to the trained artificial intelligence model to obtain words such as "hey", "what", "time", and "is it" from the obtained plurality of phonemes. Since "hey" among the obtained words matches with the predetermined word, the processor 120 may determine that the predetermined word exists in the user's voice.

At this time, the processor 120 may transmit "what time is it" that is the remaining user's voice excluding the predetermined word to the server 200. When the response information regarding "what time is it" is received from the server 200, the processor 120 may provide a response such as "The current time is 3 P.M" based on the received response information.

Figure 6:
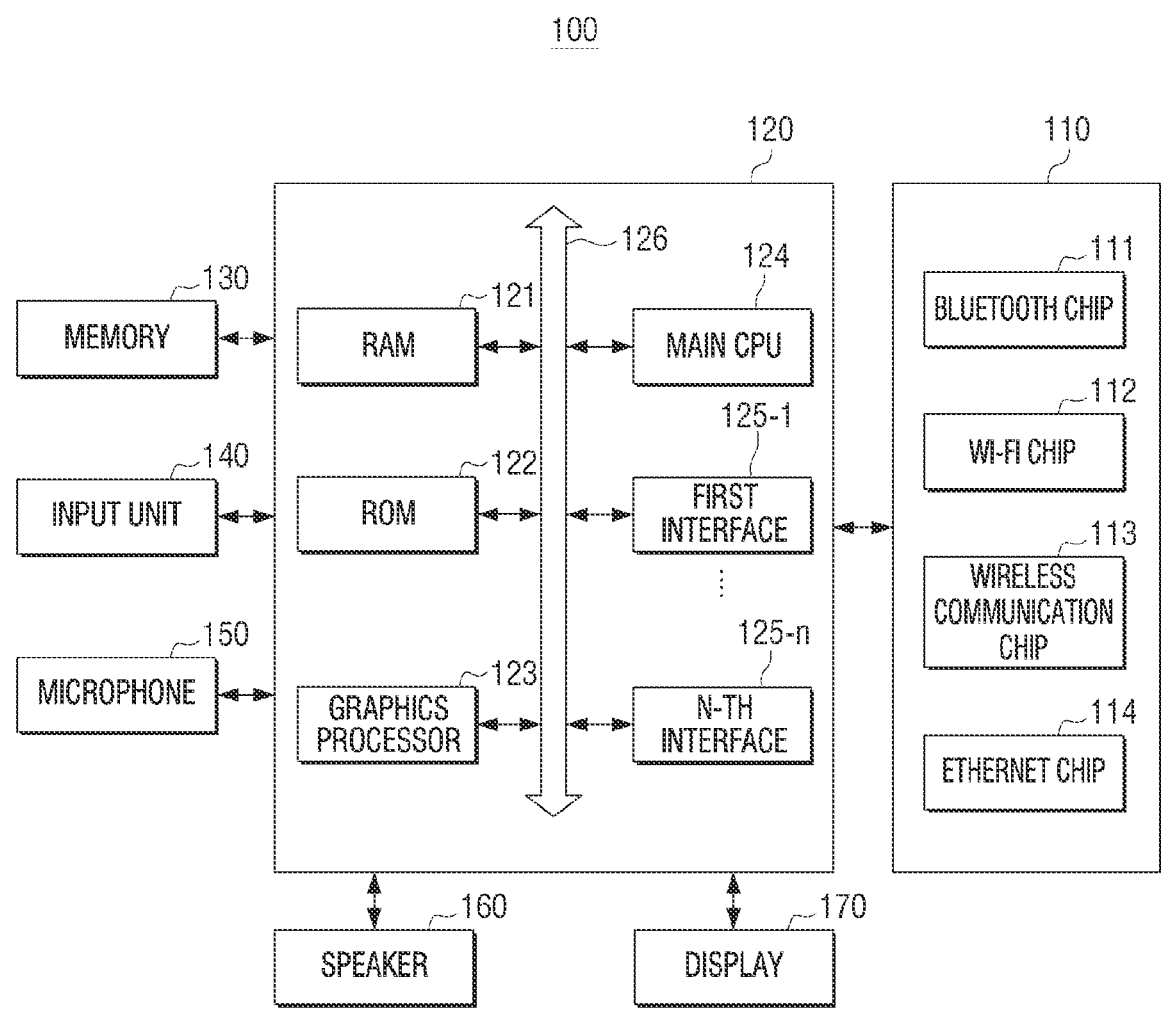
FIG. 6 is a block diagram specifically illustrating a configuration of the electronic device according to an embodiment.

FIG. 6 is a block diagram specifically illustrating a configuration of the electronic device according to an embodiment.

Referring to FIG. 6, the electronic device 100 may include the communicator 110, the processor 120, the memory 130, an input unit 140, a microphone 150, a speaker 160, and a display 170.

The communicator 110 may communicate with various types of external devices according to various communication methods. The communicator 110 may include at least one of a Bluetooth chip 111, a Wi-Fi chip 112, a wireless communication chip 113, and an Ethernet chip 114.

Herein, the communicator 110 may be controlled by the processor 120 to communicate with the server 200 or various external devices.

In particular, the communicator 110 may communicate with the server 200 for performing the speech recognition service via the trained artificial intelligence model. In other words, the communicator 110 may transmit input data including information regarding a plurality of slots to the server 200 and receive information regarding a natural language corresponding to the input data obtained through the artificial intelligence model from the server 200.

The processor 120 (or controller) may control general operations of the electronic device 100.

The processor 120 may include a RAM 121, a ROM 122, a graphics processor 123, a main CPU 124, first to n-th interfaces 125-1 to 125-n, and a bus 126. The RAM 121, the ROM 122, the graphics processor 123, the main CPU 124, and the first to n-th interfaces 125-1 to 125-n may be connected to each other via the bus 126.

The memory 130 may store various programs and data necessary for the operations of the electronic device 100. In particular, the memory 130 may store at least one instruction or data related to the speech recognition service.

The memory 130 may include a non-volatile memory, a volatile memory, a flash memory, a hard disk drive (HDD), or a solid-state drive (SSD). The memory 130 may be accessed by the processor 120 and reading, recording, editing, deleting, or updating of the data by the processor 120 may be executed. A term, memory, in the disclosure may include the memory 130, a RAM 121 or the ROM 122 in the processor 120, or a memory card (not illustrated) (e.g., micro SD card or memory stick) mounted on the electronic device 100.

In addition, the memory 130 may store a program and data for configuring various images to be displayed in a display region of the display 170, various programs and data to be output as a sound via the speaker 160, and the like.

Further, the memory 130 may store various artificial intelligence models of the disclosure.

The input unit 140 may receive various user inputs to transmit the user inputs to the processor 120. The input unit 140 may include, for example, a touch panel, a (digital) pen sensor, or a key. The touch panel may use, for example, at least one type of an electrostatic type, a pressure-sensitive type, an infrared type, or an ultrasonic type. In addition, the touch panel may further include a control circuit. The touch panel may further include a tactile layer and may provide tactile sensation to the user. The (digital) pen sensor may be, for example, a part of a touch panel or may include a separate sheet for recognition. The key may include, for example, a physical button, an optical key, or a keypad.

The microphone 150 may obtain a voice. In particular, the microphone 150 may be provided in the electronic device 100, but this is merely an embodiment, and the microphone 150 may be provided as an external device connected to the electronic device 100 electrically or via a network.

The speaker 160 may output not only various pieces of audio data obtained by executing various processing such as decoding, amplification, or noise filtering by an audio processor (not illustrated), but also various alerts or voice messages. Particularly, the configuration of outputting a sound may be implemented as the speaker 160, but this is merely an embodiment, and the configuration may be implemented as an output terminal capable of outputting audio data.

In particular, the speaker 160 may output a natural language obtained via a natural language generation unit (not illustrated) as a voice message via TTS (not illustrated).

The display 170 may display image data processed in an image processor (not illustrated) on a display region (or display). The display region may refer to at least a part of the display 170 exposed to one surface of a housing of the electronic device 100. The part of the display 170 may be combined with at least one of a front surface region, a side surface region, and a rear surface region of the electronic device 100 in a form of a flexible display. The flexible display may be curved, bent, or rolled through a paper-thin flexible substrate without any damages.

Figure 7:
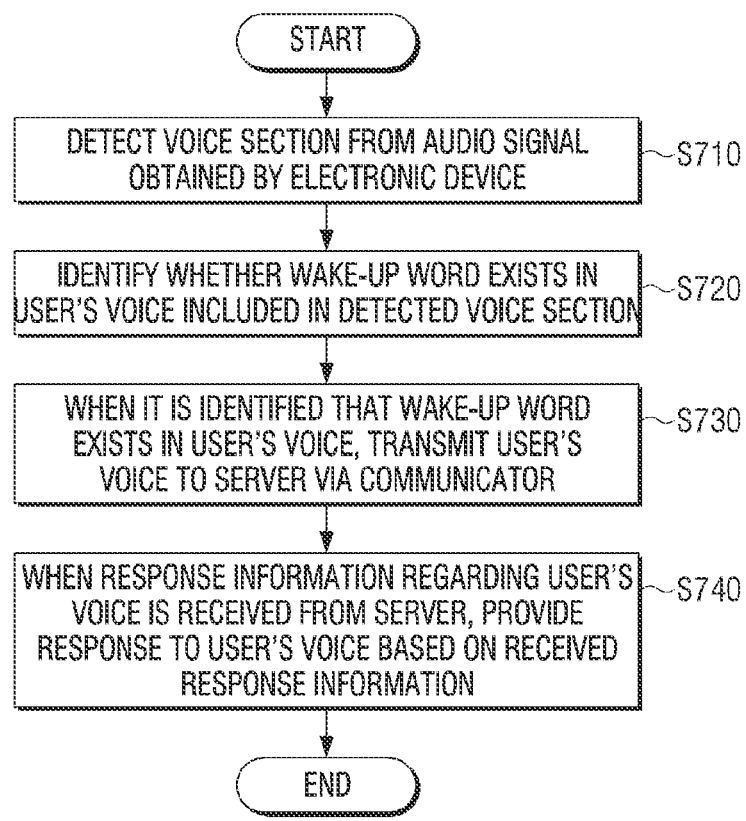
FIG. 7 is a flowchart illustrating a method for controlling the electronic device according to an embodiment.

FIG. 7 is a flowchart illustrating a method for controlling the electronic device according to an embodiment.

Firstly, the electronic device 100 may detect a voice section from the obtained audio signal (S710).

According to an embodiment, the detecting the voice section from the audio signal may include detecting a voice section and a silence section from the audio signal based on a level of the audio signal, and, based on a part of the user's voice included in the detected voice section matching with a wake-up word, identifying that the wake-up word exists in the user's voice.

Herein, the detecting the voice section from the audio signal may include detecting a section having a magnitude equal to or more than a predetermined level from the audio signal as the voice section, and detecting a section having a magnitude less than the predetermined level from the audio signal as the silence section.

Meanwhile, the detecting the voice section from the audio signal may include detecting a plurality of voice sections from the audio signal.

Next, it may be identified whether the wake-up word exists in the user's voice included in the detected voice section (S720). In particular, when a part of the user's voice matches with the wake-up word, it may be identified that the wake-up word exists in the user's voice.

According to an embodiment, the identifying whether the wake-up word exists in the user's voice may include obtaining a plurality of phonemes from the user's voice by dividing the user's voice in a phonemic unit, and, based on a word configured with the obtained plurality of phonemes matching with the wake-up word, identifying that the wake-up word exists in the user's voice.

Next, when it is identified that the wake-up word exists in the user's voice, the user's voice may be transmitted to the server 200 providing a speech recognition service via the communicator (S730).

Herein, the transmitting the user's voice to the server 200 providing the speech recognition service may include transmitting a remaining user's voice excluding the wake-up word from the user's voice to the server 200.

Herein, the transmitting the user's voice to the server 200 providing the speech recognition service may include, based on a part of the user's voice included in any one voice section among a plurality of voice sections matching with the wake-up word, transmitting a remaining user's voice excluding the wake-up word among the user's voice included in the any one voice section and a user's voice included in the remaining voice sections to the server 200.

Next, when the response information regarding the user's voice is received from the server 200, a response to the user's voice may be provided based on the received response information (S740).

Meanwhile, according to an embodiment of the disclosure, when an audio signal is obtained within a predetermined period of time after identifying that the wake-up word exists in the user's voice, it may be identified whether a predetermined word exists in a user's voice included in a voice section of the audio signal, and based on the predetermined word being identified to exist, the user's voice included in the voice section may be transmitted to the server 200.

Herein, the predetermined word may include a pronoun.

According to the various embodiments of the disclosure, it is possible to provide an electronic device for detecting a call command included in a user's voice to call a speech recognition service, even if the user consecutively utters a user's voice including a call command with natural utterance, and a control method thereof.

In addition, when calling the speech recognition service consecutively, even if a user utters a predetermined word including a pronoun, the speech recognition service may be called in the same manner as with the utterance of the call command, thereby providing natural user interface to the user.

In this disclosure, the term "unit" or "module" may include a unit implemented with hardware, software, or firmware and may be interchangeably used with terms, for example, logic, logic blocks, parts, or circuits. The "unit" or the "module" may be a part integrally formed or a minimum unit or a part of the part performing one or more functions. For example, the module may be implemented as an application-specific integrated circuit (ASIC).

Various embodiments of the disclosure may be implemented as software including instructions stored in machine (e.g., computer)-readable storage media. The machine is a device which invokes instructions stored in the storage medium and is operated according to the invoked instructions, and may include an electronic device (e.g., electronic device 100) according to the disclosed embodiments. In a case where the instruction is executed by a processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory" storage medium is tangible and may not include signals, and it does not distinguish that data is semi-permanently or temporarily stored in the storage medium.

The methods according to various embodiments may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be at least temporarily stored or temporarily generated in a storage medium such as a memory of a server of a manufacturer, a server of an application store, or a relay server.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

What is claimed is:

1. An electronic device comprising:
a communicator including a communication circuit;
at least one processor; and
memory storing instructions which, when executed by the at least one processor, cause the electronic device to:
obtain an audio signal,
detect, as non-voice sections, sections from the audio signal having a magnitude less than a predetermined level,
detect voice sections from the audio signal based on the non-voice sections,
identify whether a wake-up word exists in a user's voice included in a first voice section of the detected voice sections, wherein the wake-up word is a trigger word for executing a speech recognition service,
based on the wake-up word being identified in the first voice section,
identify voice sections of the detected voice sections for a predetermined period of time before the wake-up word is identified to exist in the user's voice and for a predetermined period of time after the wake-up word is identified to exist in the user's voice,
identify whether a predetermined word exists in the identified voice sections, wherein the predetermined word is different from the wake-up word,
based on the predetermined word being identified in the identified voice sections, transmit a user's voice in the first voice section and the identified voice sections, excluding the wake-up word, to a server for providing the speech recognition service via the communicator, and
based on response information regarding the transmitted user's voice being received from the server, provide a response to the transmitted user's voice based on the received response information.

2. The electronic device according to claim 1, wherein the instructions, when executed by the at least one processor, cause the electronic device to:
detect the voice sections, and the non-voice sections from the audio signal based on a level of the audio signal; and
based on a part of a user's voice included in the first voice section matching with the wake-up word, identify that the wake-up word exists in the user's voice included in the first voice section.

3. The electronic device according to claim 2, wherein the instructions, when executed by the at least one processor, cause the electronic device to:
detect sections having a magnitude equal to or more than the predetermined level from the audio signal as the voice sections.

4. The electronic device according to claim 1, wherein the instructions, when executed by the at least one processor, cause the electronic device to:
obtain a plurality of phonemes from the user's voice included in the first voice section by dividing the user's voice included in the first voice section in a phonemic unit; and
based on a word configured with the obtained plurality of phonemes matching with the wake-up word, identify that the wake-up word exists in the user's voice included in the first voice section.

5. The electronic device according to claim 1, wherein the predetermined word comprises a pronoun.

6. A method for controlling an electronic device, the method comprising:
obtaining an audio signal,
detecting, as non-voice sections, sections from the audio signal having a magnitude less than a predetermined level,
detecting voice sections from the audio signal based on the non-voice sections,
identifying whether a wake-up word exists in a user's voice included in a first voice section of the detected voice sections, wherein the wake-up word is a trigger word for executing a speech recognition service,
based on the wake-up word being identified in the first voice section,
identifying voice sections of the detected voice sections for a predetermined period of time before the wake-up word is identified to exist in the user's voice and for a predetermined period of time after the wake-up word is identified to exist in the user's voice,
identifying whether a predetermined word exists in the identified voice sections, wherein the predetermined word is different from the wake-up word,
based on the predetermined word being identified in the identified voice sections, transmitting a user's voice in the first voice section and the identified voice sections, excluding the wake-up word, to a server for providing the speech recognition service, and
based on response information regarding the transmitted user's voice being received from the server, providing a response to the transmitted user's voice based on the received response information.

7. The method according to claim 6,
wherein the detecting comprises:
- detecting the voice sections and the non-voice sections from the audio signal based on a level of the audio signal; and wherein the identifying whether a wake-up word exists comprises:
- based on a part of a user's voice included in the detected voice section matching with the wake-up word, identifying that the wake-up word exists in the user's voice included in the first voice section.

8. The method according to claim 7, wherein the detecting comprises:
- detecting sections having a magnitude equal to or more than the predetermined level from the audio signal as the voice sections.

9. The method according to claim 6, wherein the identifying whether a wake-up word exists comprises:
- obtaining a plurality of phonemes from the user's voice included in the first voice section by dividing the user's voice included in the first voice section in a phonemic unit; and
- based on a word configured with the obtained plurality of phonemes matching with the wake-up word, identifying that the wake-up word exists in the user's voice included in the first voice section.

\* \* \* \* \*